United States Patent [19]
Bolleman et al.

[11] Patent Number: 5,682,075
[45] Date of Patent: Oct. 28, 1997

[54] POROUS GAS RESERVOIR ELECTROSTATIC TRANSDUCER

[75] Inventors: Brent J. Bolleman; Lorne A. Whitehead, both of Vancouver, Canada

[73] Assignee: The University of British Columbia, Vancouver, Canada

[21] Appl. No.: 525,294

[22] Filed: Sep. 7, 1995

Related U.S. Application Data

[63] Continuation-in-part of Ser. No. 91,009, Jul. 14, 1993, Pat. No. 5,450,498.

[51] Int. Cl.$^6$ ...................................................... H02N 1/00
[52] U.S. Cl. ................................................................ 310/309
[58] Field of Search ............................ 310/309; 381/190, 381/191

[56] References Cited

U.S. PATENT DOCUMENTS

| | | | |
|---|---|---|---|
| 1,777,170 | 9/1930 | Kyle | 381/191 |
| 2,796,467 | 6/1957 | Kock | 381/191 |
| 2,872,532 | 2/1959 | Buchmann et al. | 381/191 |
| 2,975,307 | 3/1961 | Schroeder et al. | 310/309 |
| 3,136,867 | 6/1964 | Brettell | 381/191 |
| 3,544,733 | 12/1970 | Reylek et al. | 381/191 |
| 3,787,642 | 1/1974 | Young, Jr. | 381/191 |
| 4,160,881 | 7/1979 | Smulders | 381/191 |
| 4,322,877 | 4/1982 | Taylor | 310/800 X |
| 4,382,196 | 5/1983 | Miller et al. | 307/400 |
| 4,533,795 | 8/1985 | Baumhauer, Jr. et al. | 381/191 |
| 4,582,163 | 4/1986 | Catthoor | 381/169 |
| 4,654,546 | 3/1987 | Kirjavainen | 307/400 |
| 4,885,783 | 12/1989 | Whitehead et al. | 381/191 |
| 5,206,557 | 4/1993 | Bobbio | 310/309 |
| 5,395,592 | 3/1995 | Bolleman et al. | 422/128 |
| 5,434,464 | 7/1995 | Bobbio | 310/309 |
| 5,461,272 | 10/1995 | Matsumoto | 310/309 |
| 5,485,437 | 1/1996 | Gregg | 310/309 X |
| 5,563,466 | 10/1996 | Rennex et al. | 310/309 |

OTHER PUBLICATIONS

C.R. Hanna, Theory of the Electrostatic Loudspeaker, *J. Acoust. Soc. Amer.*, vol. II, No. 2, pp. 143–149, 1930.

Skvor, Z., On the Acoustical Resistance Due to Viscous Losses in the Air Gap of Electrostatic Transducers, *Acustica* vol. 19, 1967/68, pp. 295–299.

Baxandall, P.J., Electrostatic Loudspeakers, in *Loudspeaker and Headphone Handbook*, 2nd ed., edited by John Borwick (Butterworth–Heinemann, Oxford, 1994), Chap. 3.

*Primary Examiner*—Mark O. Budd
*Attorney, Agent, or Firm*—Oyen Wiggs Green & Mutala

[57] ABSTRACT

An electrostatic transducer in which a plurality of perforated sheets are arranged adjacent one another in a stack. A gas-filled gap separates each adjacent pair of sheets. Conductive surfaces on each sheet impose an electric field within the respective gaps. A flexible positioning mechanism disposed between each adjacent pair of sheets maintains a desired average thickness of the gaps. A high porosity gas reservoir structure is fixed to one outer end of the stack, such that gas may flow through the sheets between the respective gaps and the reservoir. A cover sheet fixed to an end of the stack opposite the reservoir prevents gas flow between the gaps and the region external to the stack during operation of the transducer within its intended operating frequency range.

8 Claims, 5 Drawing Sheets

POROUS GAS RESERVOIR ELECTROSTATIC TRANSDUCER

REFERENCE TO RELATED APPLICATION

This is a continuation-in-part of United States Patent Application Ser. No. 08/091,009 filed 14 Jul., 1993.

FIELD OF THE INVENTION

This application relates to an electrostatic electromechanical film transducer consisting of a porous gas reservoir and one or more compliantly separated electrically conductive layers, wherein the gas pockets between each layer are vented to a single acoustic gas reservoir.

BACKGROUND OF THE INVENTION

There are a number of applications in airborne acoustics where a transducer with the physical form of a large area flexible sheet material would be a useful improvement over the prior art. Attempts have been made in the past to construct such a device using piezoelectric transduction (e.g. U.S. Pat. No. 4,322,877 (Taylor)) and electrostatic transduction (e.g. U.S. Pat. Nos. 4,654,546 (Kirjavainen); 3,544,733 (Reylek et al); 4,885,783 (Whitehead et al), and 4,382,196 (Miller et al)). Among other potential shortcomings in performance, approaches based on piezoelectrics appear expensive to manufacture and thus have not been commercialized.

An electrostatic electromechanical transducer consists basically of two parallel electrically conductive sheets which are compliantly separated and electrically insulated from one another. Typically one of the electrodes is fixed while the other is free to move. When the transducer is used as an actuator, a voltage is applied across the two electrodes, and this induces electrostatic attraction between them. The resultant electrostatic force per unit area causes the mobile electrode to move closer to the fixed electrode. If a time varying voltage is applied, the mobile electrode experiences a time varying force per unit area, and in response it will vibrate and acoustic waves will be radiated. When the transducer is used as a sensor, a constant voltage is applied across the electrodes either by permanent charging of a polymer (i.e. electret), or by an imposed voltage. When the mobile electrode moves in response to incoming acoustic waves, this motion is detect-ed as current flow through the device. For a general description of electrostatic loudspeaker design, refer to C. R. Hanna, "Theory of the Electrostatic Loudspeaker," *J. Acoust. Soc. Amer.*, Vol. II, No. 2, p. 143–149, 1930; or to Baxandall, P. J., "Electrostatic Loudspeakers," in *Loudspeaker and Headphone Handbook*, 2nd ed., edited by John Borwick (Butterworth-Heinemann, Oxford, 1994), Chap. 3.

Electrostatic electromechanical film transducers have been based on the concept of a thin compressible dielectric. For example, in U.S. Pat. No. 4,885,783 (Whitehead et al) devices are shown wherein microstructured elastomeric spacers are used to directly define small gas (e.g. air) pockets between two electrode sheets. Since the gas volume per unit area, $d_e$, is quite small (e.g. 10 µm) in these devices, the dynamic stiffness, k, of the gas is quite high (e.g. 14 GPa/m), the two being related by the following equation for adiabatic compression:

$$k = \frac{\rho c^2}{d_e} \quad (1)$$

where p and c are the density and wave speed respectively of the compressed gas. The high dynamic stiffness of these devices limits their amplitude of motion to a small fraction of that possible if the dynamic stiffness of the gas were not present. Such a device is relatively efficient when coupled to high impedance media such as water, but is of quite low efficiency when coupled to low impedance media such as air. This problem of high dynamic stiffness also limits the usefulness of devices disclosed in U.S. Pat. Nos. 4,654,546, 3,544,733, and 4,382,196. Increasing the separation of the electrodes to increase $d_e$ and thereby reduce the dynamic stiffness of the air can be used in applications where high electrostatic driving forces are not required, and high driving levels are not a problem. Examples of compressible dielectric devices of this sort are given in U.S. Pat. Nos. 3,787,642 (Young, Jr.); 2,796,467 (Kock); 1,777,170 (Kyle); and, 2,872,532 (Buchmann et al).

In United States Patent Application Ser. No. 08/091,009 (Whitehead), which is the parent of the present application, the high dynamic stiffness problem of the prior art is partially solved by allowing the interelectrode gas to be vented to an adjacent gas reservoir of much greater volume per unit area. This dramatically increases the total gas volume being compressed by the relative motion of the electrode sheets without compromising the small interelectrode spacing which is desirable for high gas dielectric strength, low operating voltage, high electromechanical coupling, etc. The increase in gas volume per unit area of electrode sheet reduces the dynamic stiffness of the air, and results in higher amplitudes of motion for a given electrostatic driving force. This dramatically improves the efficiency when coupling to low impedance media such as air.

Despite this improved efficiency, the maximum displacement of the mobile electrode sheet is still limited to some fraction of the interelectrode spacing. As noted above, it is undesirable to increase the interelectrode spacing to solve this problem, and so an alternate approach must be found. One relatively simple method of increasing the overall amplitude is to stack multiple layers of the basic transducer together to produce a composite transducer capable of higher amplitudes. In such a multilayer device, adjacent electrode sheets are charged with opposite polarity so that the entire structure contracts in unison and results in a displacement of the outer surface in contact with the medium which is equal to the sum of the displacements in each individual layer. This technique has been suggested elsewhere for use with electrostatic transducers (e.g. U.S. Pat. Nos. 4,885,783; 4,654,546; and 3,544,733) and is also commonly used in piezoelectric transducer design.

However, a problem arises when one wishes to produce a multilayer device using a gas reservoir structure of the type described in the parent application. Since the structure containing the gas reservoir is inherently quite thick (to contain the large gas volumes), it is also quite massive, and hence the stacking of a number of these gas reservoir layers results in a relatively large effective mass impedance for the transducer as a whole. This increase in mass impedance can seriously hinder the performance of the device, and as such is not desirable. The present invention addresses these shortcomings in the prior art.

SUMMARY OF THE INVENTION

In accordance with the preferred embodiment, the invention provides an electrostatic transducer in which a plurality of sheets, each having an electrically conductive layer bonded to an elastomeric micro-structure, are stacked and bonded atop one another. The sandwich of stacked layers is perforated, allowing most of the gas trapped between the layers to flow through the perforations. One end of the perforated structure is bonded to a porous sheet material which acts as a gas reservoir. A cover sheet is bonded to the opposite, movable end of the structure, preventing gas flow between the structure and the environment outside the structure.

The composite structure is a transducer in the form of relatively thin flexible film which can be bonded, like tape, to a surface to efficiently produce large amplitude (e.g. 10 µm rms) acoustic vibrations. The transducer appears to be useful in a number of applications including audio loudspeakers and active noise control. It has unique advantages in terms of its thinness, low areal density, and high durability compared to existing electrodynamic and electrostatic transducers conventionally used in such applications.

DETAILED DESCRIPTION OF THE PREFERRED EMBODIMENT

Figure 1:
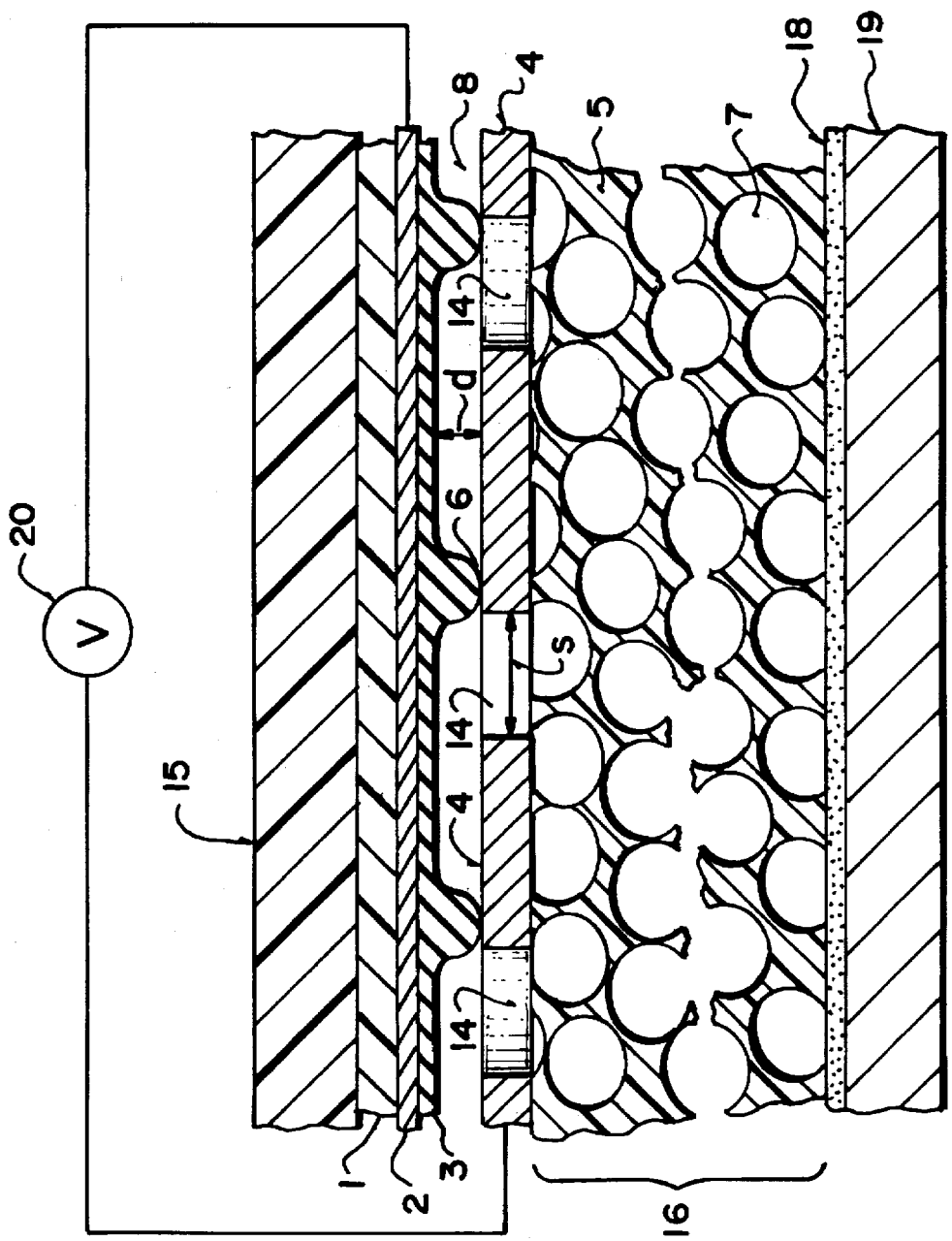
FIG. 1 shows a partially fragmented cross-section of a single layer electrostatic transducer having a porous acoustic gas reservoir and a microperforated stationary electrode.

FIG. 1 shows in cross-section an improved design for an electrostatic transducer of the type described in parent United States Patent Application Ser. No. 08/091,009 (Whitehead). In this improved design, first and second electrically conductive sheets 2, 4 are compliantly separated by elastomeric microstructure 3. Electrically conductive surface 2 is a thin film of metal (e.g. aluminum) vacuum deposited or laminated onto a polymer (e.g. polyester) carrier film 1. An additional protective covering layer 15 may be laminated to carrier film 1 to provide added durability. However, this increases the mass impedance of the moving electrode and thus must be employed with proper consideration for its impact on the operation of the transducer. Electrically conductive sheet 4 is a sheet of microporous material bonded to the surface of porous structure 16. Porous structure 16 can be manufactured by a number of techniques known in the art such as sintering polymer or metal particles 5 together to leave gas-filled spaces 7 which are in fluidic communication (also known in the art as an open-cell structure).

Microporous conductive sheet 4 may for example be a finely woven wire cloth or a metal sheet microperforated by some means such as chemical etching. Alternatively, sheet 4 may be a polymer/metal composite which has been perforated or a sintered metal. The pore diameter, s, and the spacing between each of pores 14 required to achieve an optimal trade-off between loss of active area of electrode 4 and increased viscous resistance to gas flow can be estimated to first order using available analytical formulations and techniques know in the art. See for example, Skvor, Z., "On the Acoustical Resistance Due to Viscous Losses in the Air Gap of Electrostatic Transducers," Acustica Vol. 19, 1967/68, p. 295–299; or, the discussion in U.S. Pat. No. 4,533,795 (Baumhauer, Jr. et al) beginning at line 60 of column 6.

Porous structure 16 should be of relatively high porosity to maximize gas reservoir volume for a given thickness of material. However, this must be balanced by the fact that structure 16 should also be substantially rigid and inextensible in the thickness direction so that microporous sheet electrode 4 is substantially stationary relative to foundation 19 (e.g. a wall) to which the transducer is bonded by adhesive layer 18. If electrode 4 is not held stationary relative to foundation 19, then depending on the relative values of the other impedances, the electrostatic force may move electrode 4 instead of electrode 2 and this will lower the performance of the device. This requirement suggests a preference toward rigid materials for porous structure 16. The depth of structure 16 is dependent upon its desired porosity and the effective gas volume per unit area $d_e$ required for the particular application. Larger depths yield large $d_e$ and hence a lower stiffness impedance for the gas, which is desirable in most applications. However the maximum thickness tolerable will depend upon the particular application. For many applications, the depth of structure 16 is likely to be within the range of 0.1 mm to 10 mm.

Elastomeric microstructure 3 may be formed on the surface of conductive sheet 2 using proprietary microreplication process technology services available from parties such as 3M Optics Technology Centre, St. Paul, Minn. The design of microstructure 3 and selection of elastomer formulation will depend on the performance and manufacturability requirements for a particular application. In general, an elastomer with high resilience and high dielectric strength is preferable from a performance standpoint.

The gas pocket depth, d, is also determined by application requirements. Where high driving pressures are required, the pocket depth will typically be less than the Paschen minimum distance for the gas 8 and gas pressure in order to obtain high dielectric strength as described in U.S. Pat. No. 4,885,783 (Whitehead et al). For air at standard pressure, the Paschen minimum distance is approximately 16 µm. In applications where less driving pressure is required, and more allowable amplitude would be desirable, larger gaps may be used at the expense of higher operating voltages.

Elastomeric microstructure 3 may be bonded to surface 4 at interface 6 by a number of suitable adhesive processes such as spray or roll coating of a thin adhesive film (not shown) onto either of elastomeric microstructure or surface 4. The adhesive should be able to withstand the dielectric and mechanical stress of the intended application and should be as thin as possible to achieve these objectives so as not to substantially increase the voltage required to operate the device. Also, the adhesive should not substantially block the flow of gas through microperforated electrode 4. If thermoplastic elastomers are selected for microstructure 3, thermoplastic bonding may prove to be a desirable method of bonding elastomer 3 to surface 4.

The transducer just described is operated by connecting one terminal of voltage source 20 to electrode sheet 2 and the other terminal to perforated electrode sheet 4. The applied voltage may be similar to that commonly used in the art consisting of a DC bias ($V_{dc}$) and an AC signal ($V_{ac}$). If $V_{ac}$ is small compared to $V_{dc}$ then the time varying electrostatic force per unit area $P_e$ produced will be as follows:

$$P_e = \frac{\epsilon V_{dc} V_{ac}}{2h^2} \quad (2)$$

where h is the interelectrode spacing and $\epsilon$ is the electrical permittivity of the dielectric. This electrostatic force per unit area will result in a deformation of elastomeric microstructure 3 and a relative motion between the two electrodes. If, for example, porous structure 16 supporting electrode sheet 4 is fixed to a foundation, and carrier film 1 with optional protective covering layer 15 are free to move, then electrode 2 will move in response to signal voltage $V_{ac}$. For a small range of amplitudes, this motional response will be in approximately linear proportion to the driving signal $V_{ac}$. A number of other driving arrangements may be used, depending upon the particular application.

The motion of electrode 2 relative to perforated electrode 4 compresses gas 8 between electrodes 2, 4 causing gas 8 to flow through pores 14 into porous gas reservoir structure 16. If the viscous and mass impedances of this gas flow are small compared to its compressire (i.e. stiffness) impedance, then its effective stiffness impedance can be calculated based on the sum of the volume of gas in porous gas reservoir structure 16 and in the interelectrode gas pockets 8 in accordance with Eq. 1 above. Since the volume of gas per unit area can be made very large in porous gas reservoir structure 16, the effective stiffness impedance of the gas in the transducer can be made at least one order of magnitude lower than it would otherwise have been. If the stiffness impedance of the gas is made very low, then the stiffness impedance of the elastomer microstructure will dominate.

The transducer depicted in FIG. 1 is similar in functionality to devices previously described in the parent application U.S. Ser. No. 08/091,009 in that a series of recessed regions of gas pocket depth substantially greater than the interelectrode gas pocket depth are used to increase the effective volume of gas per unit area and hence reduce the dynamic stiffness per unit area of the gas. However, the present design is an improvement in that it appears to be significantly less expensive to construct in order to achieve similar functionality. Nonetheless, the present design is limited to a maximum displacement which is some fraction (e.g. 30%) of the gas pocket thickness. As mentioned earlier, it is desirable in many applications to be able to increase the maximum volumetric displacement of the transducer beyond this amount. Multilayering of the transducer can be used to achieve this, but results in a greatly increased mass impedance which is typically undesirable.

Figure 2:
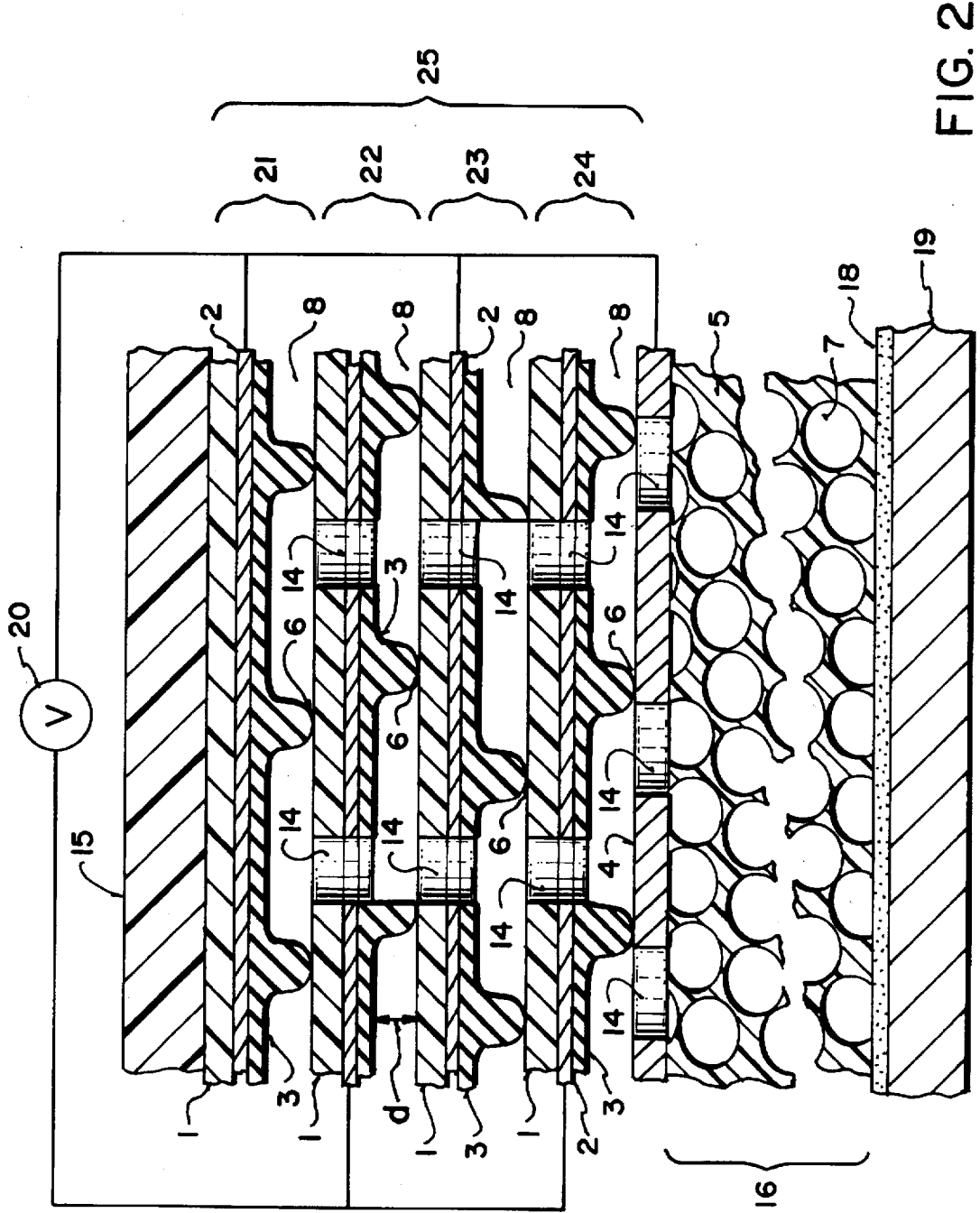
FIG. 2 shows a partially fragmented cross-section of a multiple layer electrostatic transducer wherein the layers have been perforated in situ and the perforations in each layer are substantially in alignment.

Referring to FIG. 2, a second embodiment of the present invention which solves this problem of increased mass impedance is shown in cross-section. Here, a device is shown similar to that of FIG. 1, with three additional perforated "layers" of transducer. Each "layer" consists of a polymer carrier film 1 with a conductive sheet 2 and elastomeric microstructure 3 as described earlier in reference to FIG. 1.

All "layers", except the outermost one, are substantially perforated (e.g. greater than 1% open area) to allow communication between the gas contained in gas pockets 8 and porous gas reservoir 16. The outermost layer is not substantially perforated, as this would inhibit the ability of the device to produce a localized volumetric displacement of the fluid, which is necessary for propagation of acoustic waves. Some degree of perforation in the outermost layer is usually desirable to balance the ambient gas pressure on the exterior of the device with that on the interior. Also, it may be desirable to introduce perforations in order to vary the acoustic output frequency response of the device (see for example U.S. Pat. No. 4,582,163 (Catthoor)). Fluid communication between the gas inside the transducer and the environment at the edges of the transducer is typically prevented by sealing the edges (not shown).

As shown in FIG. 2, the electrode sheets in every second layer are connected to one terminal of the power supply, whilst the remainder are connected to the opposite terminal. In this configuration, all adjacent electrode sheets are of opposite polarity and will be attracted toward each other upon application of a voltage signal.

When a voltage signal is applied, the elastomeric microstructures compliantly spacing the electrode sheets apart deform and compress the gas 8 contained between them, forcing the gas through the perforations in each successive layer and ultimately into porous gas reservoir 16. The viscous impedance to this gas flow to and from reservoir 16 should be of the same order or less than the largest other impedance to the motion of the outer (i.e. mobile) surface of the transducer. To achieve this, one must select the correct number, spacing, and cross-sectional area of perforations 14. This can be done using techniques know in the art, as described in the Skyor and Baumhauer, Jr. et al references noted above.

A preferred method of manufacturing the embodiment shown in FIG. 2 is to first stack and bond the three layers 22, 23, 24. Bonding is achieved with a thin film of adhesive, or alternatively by other means such as thermoplastic fusing, etc. This multilayer structure is then perforated by an appropriate perforation technology such as mechanical or hot pin punching, laser ablation, fluid jet punching, electrical discharge (e.g. U.S. Pat. No. 4,777,338), etc. The perforated structure 25 is then bonded to the porous structure 16 and the non-perforated top layer 21. Using this method of manufacture, the perforations in each layer are substantially aligned.

Figure 3:
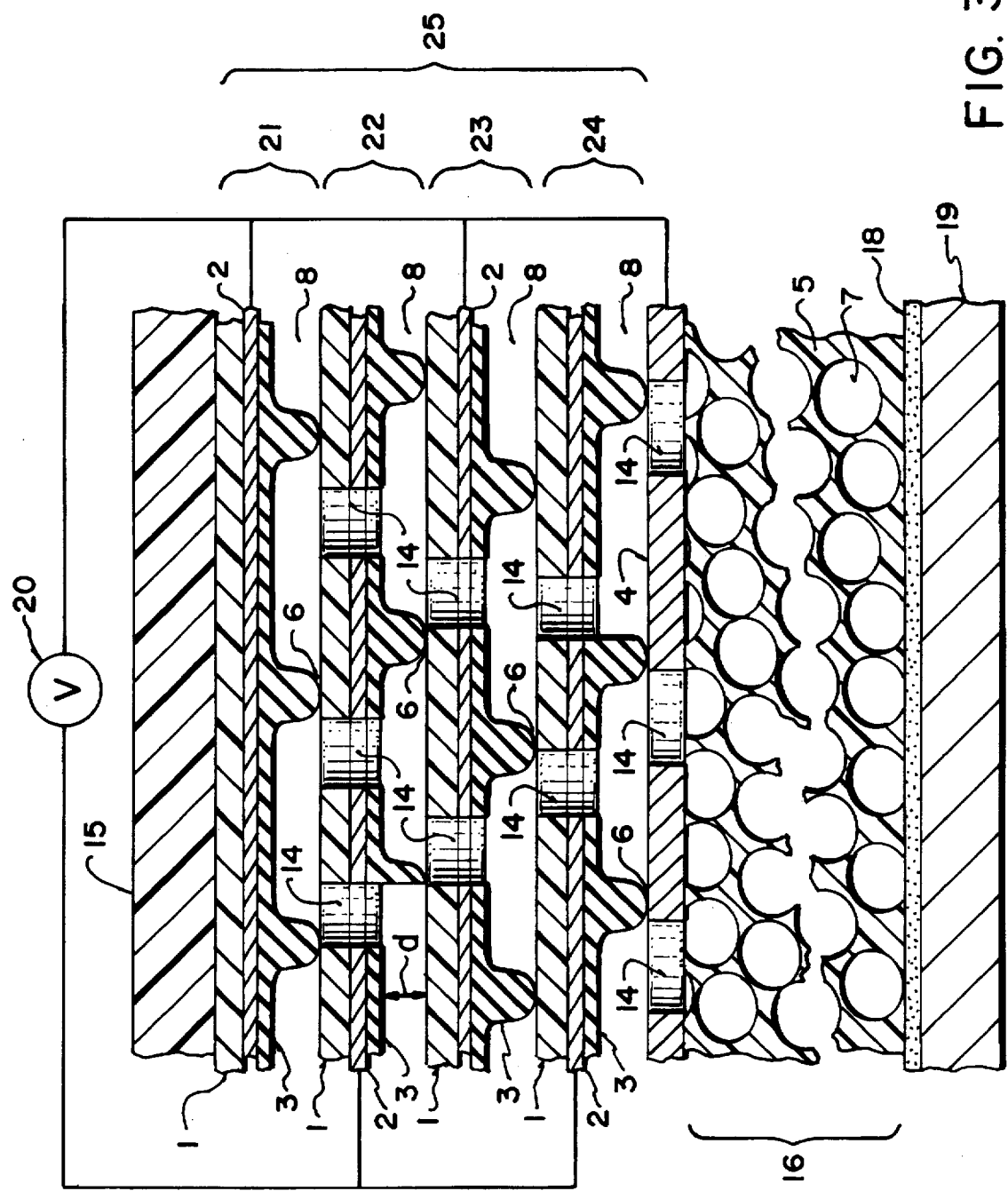
FIG. 3 shows a partially fragmented cross-section of a multiple layer electrostatic transducer wherein the layers have been perforated ex situ and the perforations in each layer are substantially not in alignment.

Another method of manufacturing the present invention involves first perforating each individual layer and then bonding them together to form a structure as depicted in cross-section in FIG. 3. Here, perforations 14 are substantially misaligned (it would be quite costly to provide a means of registering them into alignment on this size scale and speed of manufacture).

Figure 4:
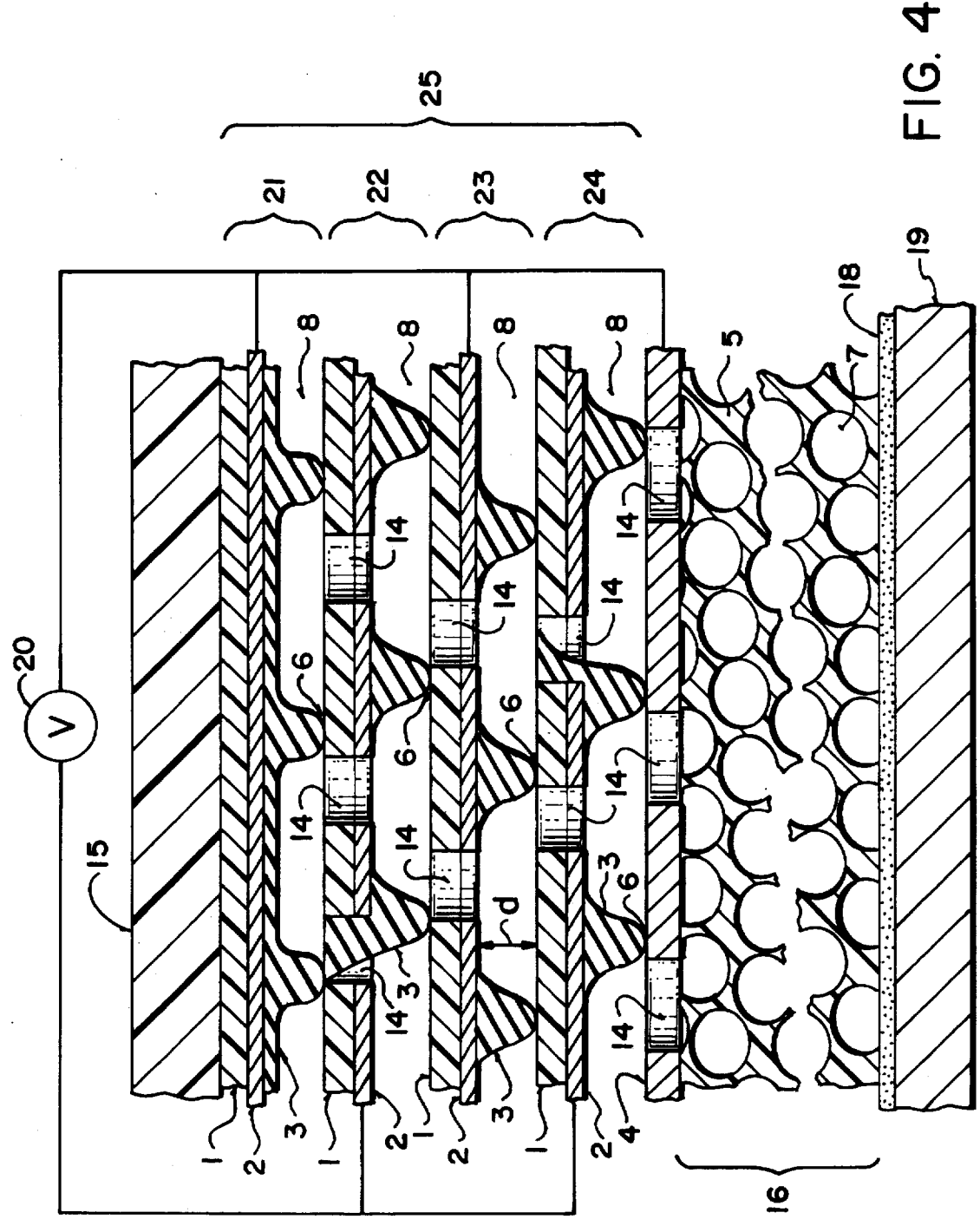
FIG. 4 shows a partially fragmented cross-section of a multiple layer electrostatic transducer wherein elastomeric spacers have been deposited on previously perforated substrates.

A third method of manufacturing the present invention is to use a carrier film 1 which has been previously perforated and metallized to form conductive surface 2. Elastomeric spacers 3 are then deposited on surface 2. This results in blockage of only a small number of perforations 14 in those areas where the location of spacers 3 and perforations 14 happen to coincide, as shown in cross-section in FIG. 4. The advantage of this method of manufacture is that there are microperforated polymer films available which could be used and could obviate the need for an additional state of manufacturing process.

Figure 5:
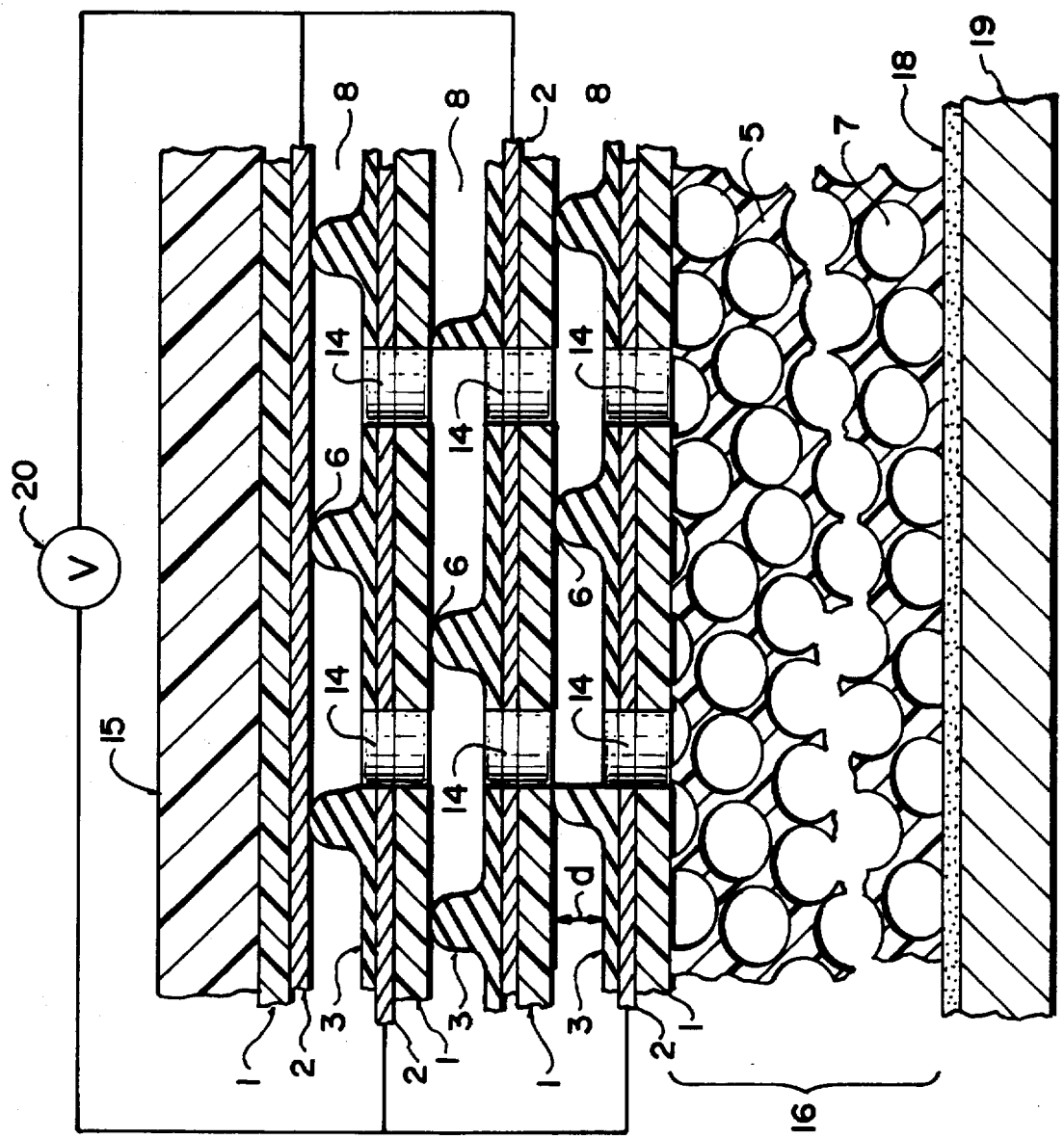
FIG. 5 shows a partially fragmented cross-section of a multiple layer electrostatic transducer similar to that of FIG. 2, but with the stacked "layers" in reversed orientation.

FIG. 5 shows yet another method of manufacturing transducers in accordance with the invention. Here, the basic design depicted in FIG. 2 is shown but with the stacked "layers" in reversed orientation. The FIG. 5 design obviates the need for the lower microperforated electrode 4 seen in FIG. 2, which may afford manufacturing cost advantages in certain applications. The "reversed orientation" design depicted in FIG. 5 may be applied to any of the designs hereinbefore described and illustrated.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrostatic transducer having an intended operating frequency range and comprising:
   (a) a plurality of perforated sheets arranged adjacent one another in a stack;
   (b) a gas-filled gap separating each adjacent pair of said sheets;
   (c) a conductive surface on each of said sheets for imposing an electric field within said respective gaps;
   (d) flexible positioning means disposed between each adjacent pair of said sheets for maintaining a desired average thickness of said respective gaps;
   (e) a high porosity gas reservoir structure fixed to one outer end of said stack for gas flow through said sheets between said respective gaps and said reservoir; and,
   (f) a cover sheet fixed to an end of said stack opposite said one end to prevent gas flow between said gaps and a region external to said stack during operation of said transducer within said intended operating frequency range.

2. An electrostatic transducer as defined in claim 1, wherein said flexible positioning means are deformable elastomeric microstructures.

3. An electrostatic transducer as defined in claim 1, wherein:
   (a) said gas has a gas pressure within said respective gaps; and,
   (b) desired average thickness of said respective gaps is less than or equal to the Paschen minimum distance for said gas and said gas pressure.

4. An electrostatic transducer as defined in claim 2, wherein:
   (a) said gas has a gas pressure within said respective gaps; and,
   (b) desired average thickness of said respective gaps is less than or equal to the Paschen minimum distance for said gas and said gas pressure.

5. An electrostatic transducer as defined in claim 1, further comprising thermoplastic bonding means for thermoplastically bonding said flexible positioning means to each of said adjacent sheets.

6. A method of making an electrostatic transducer as defined in claim 1, said method comprising the steps of:
   (a) arranging a plurality of sheets adjacent one another to form said stack; and then,
   (b) perforating said sheets.

7. A method of making an electrostatic transducer as defined in claim 1, said method comprising the steps of:
   (a) perforating a plurality of sheets; and then,
   (a) arranging said perforated sheets adjacent one another to form a stack.

8. An electrostatic transducer having an intended operating frequency range and comprising:
   (a) first and second sheets separated by a gas-filled gap, each of said sheets having a conductive surface for imposing an electric field within said respective gaps, one of said sheets having a plurality of perforations;
   (b) flexible positioning means disposed between said sheets for maintaining a desired average thickness of said gap;
   (c) a porous gas reservoir structure rigidly bonded to said perforated sheet;
   wherein:
   (i) said gas has a gas pressure in said gap;
   (ii) said desired average gap thickness is less than or equal to the Paschen minimum distance for said gas and said gas pressure;
   (iii) said sheets have:
      (A) a component $z_{gap}$ of net mechanical impedance per unit area to pressure changes required to compress and rarefy said gas within said gap;
      (B) a component $z_{mass}$ of net mechanical impedance per unit area due to said sheets' mass;
   (iv) said porous gas reservoir structure contains a volume of gas per unit area sufficiently large that said component $z_{gap}$ has a magnitude of the same order as, or less than the magnitude of said component $Z_{mass}$ at frequencies within said intended operating frequency range; and,
   (v) said flexible positioning means has a net mechanical impedance per unit area $Z_{pos}$ having a magnitude of the same order as, or less than, the magnitude of said component $Z_{mass}$ for frequencies within said intended operating frequency range.

* * * * *